US012554891B2

(12) United States Patent
Bitran et al.

(10) Patent No.: US 12,554,891 B2
(45) Date of Patent: Feb. 17, 2026

(54) SYSTEM AND METHOD FOR REVIEWING GROUNDING MATERIAL

(71) Applicant: Microsoft Technology Licensing, LLC, Redmond, WA (US)

(72) Inventors: Hadas Bitran, Ramat Hasharon (IL); Bert Hoorne Jozef Prosper, Knesselare (BE); Ksenya Kveler, Nesher (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 129 days.

(21) Appl. No.: 18/420,088

(22) Filed: Jan. 23, 2024

(65) Prior Publication Data

US 2025/0238552 A1 Jul. 24, 2025

Related U.S. Application Data

(60) Provisional application No. 63/588,625, filed on Oct. 6, 2023.

(51) Int. Cl.
*G06F 21/00* (2013.01)
*G06F 21/64* (2013.01)
*G06N 3/0475* (2023.01)
*H04L 9/40* (2022.01)

(52) U.S. Cl.
CPC .......... *G06F 21/64* (2013.01); *G06N 3/0475* (2023.01); *H04L 63/10* (2013.01)

(58) Field of Classification Search
None
See application file for complete search history.

(56) References Cited

U.S. PATENT DOCUMENTS

2025/0045336 A1* 2/2025 Gonsalves .......... G06F 16/3329

OTHER PUBLICATIONS

Yuchen Yang et al: "SneakyPrompt: Evaluating Robustness of Text-to-image Generative Models' Safety Filters", arxiv.org, Cornell University Library, 201 Olin Library Cornell University Ithaca, NY 14853, May 20, 2023 (May 20, 2023), XP091514053 (Year: 2023).*
Miaoran Li et al: "Self-Checker: Plug-and-Play Modules for Fact-Checking with Large Language Models", arxiv.org, Cornell University Library, 201 Olin Library Cornell University Ithaca, Ny 14853, May 24, 2023 (May 24, 2023), XP091517204 (Year: 2023).*
International Search Report and Written Opinion received for PCT Application No. PCT/US2024/047916, Nov. 25, 2024, 11 pages.
Li, et al., "Self-Checker: Plug-and-Play Modules for Fact-Checking with Large Language Models", In Repository of arXiv:2305.14623v1, May 24, 2023, 8 Pages.
Yang, et al., "SneakyPrompt: Evaluating Robustness of Text-to-image Generative Models' Safety Filters", In Repository of arXiv:2305.12082v1, May 20, 2023, 14 Pages.

* cited by examiner

*Primary Examiner* — Andrew J Steinle
(74) *Attorney, Agent, or Firm* — Foley IP Law, PLLC

(57) ABSTRACT

A method, computer program product, and computing system for: receiving a request from a user to use grounding material in a generative AI system; establishing a network connection with trusted-source material to allow access to the trusted-source material; processing the grounding material to confirm the integrity of the grounding material; and allowing the grounding material to be utilized in the generative AI system if the integrity of the grounding material is confirmed.

19 Claims, 3 Drawing Sheets

SYSTEM AND METHOD FOR REVIEWING GROUNDING MATERIAL

RELATED APPLICATION(S)

This application claims the benefit of U.S. Provisional Application No. 63/588,625, filed on 6 Oct. 2023, the entire contents of which are incorporated herein by reference.

TECHNICAL FIELD

This disclosure relates to generative AI systems and, more particularly, to the grounding data used by generative AI models.

BACKGROUND

Generative AI systems allow customers to create their own custom generative AI endpoints that are grounded on customer data (i.e., grounding data). Accordingly, the reliability and trustworthiness of the output of the generative AI system is highly dependent upon the grounding data.

Therefore, if the grounding data is obtained from reliable and trusted sources, the reliability and trustworthiness of the output of the generative AI system may (generally speaking) be trusted and accurate. However, if the grounding data is extremist/conspiratorial/hate-filled content, the quality and accuracy of the output of the generative AI system may be highly problematic.

BRIEF DESCRIPTION OF THE DRAWINGS

Like reference symbols in the various drawings indicate like elements.

DETAILED DESCRIPTION OF THE PREFERRED EMBODIMENTS

As will be discussed in greater detail below, implementations of the present disclosure may monitor and process the material that a user proposes for grounding a generative AI system. This processing of the proposed grounding material may result in such proposed grounding material being scrutinized to determine the reliability and trustworthiness of such proposed grounding material. Implementations of the present disclosure may allow the grounding material to be utilized in the generative AI system if the reliability and trustworthiness of the grounding material is confirmed.

By processing the material that a user proposes using for grounding a generative AI system, problematic information (e.g., inaccurate, socially-unacceptable, etc.) may be prevented from being used to ground the generative AI system.

The details of one or more implementations are set forth in the accompanying drawings and the description below. Other features and advantages will become apparent from the description, the drawings, and the claims.

Figure 1:
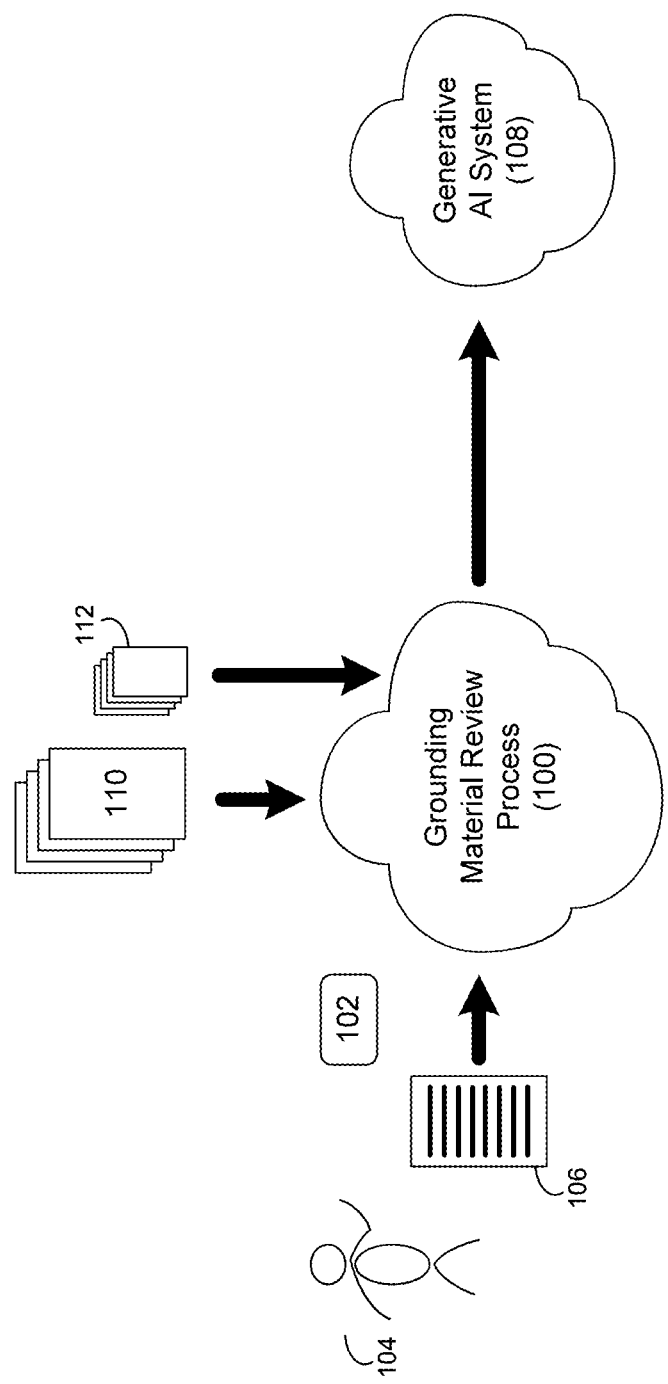
FIG. 1 is a diagrammatic view of a grounding material review process in accordance with various embodiments of the present disclosure.
Figure 2:
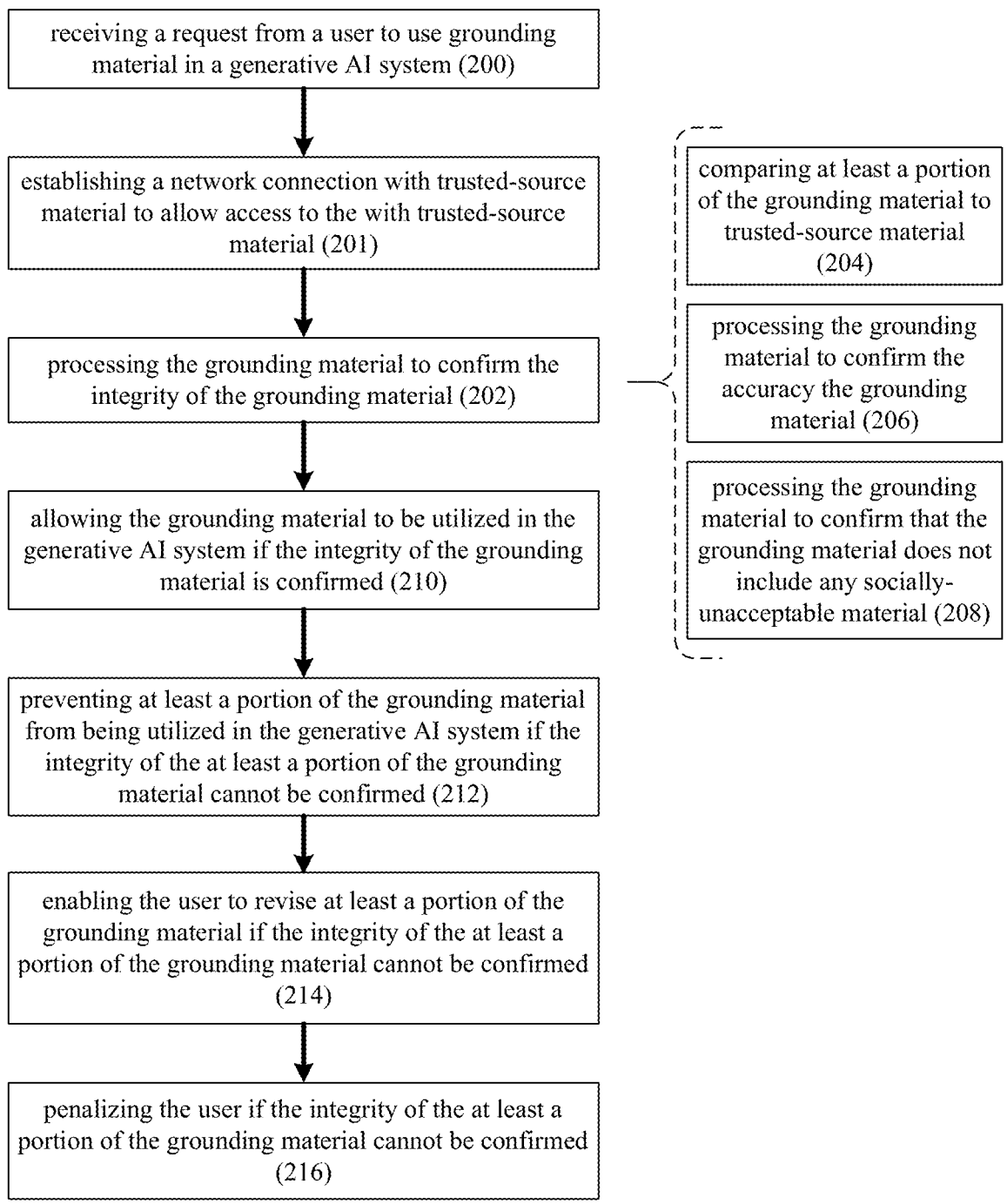
FIG. 2 is a flow chart of one implementation of the grounding material review process of FIG. 1 in accordance with various embodiments of the present disclosure.

Grounding Material Review Process:

Referring to FIGS. 1-2, grounding material review process 100 may receive 200 a request (e.g., request 102) from a user (e.g., user 104) to use grounding material (e.g., grounding material 106) in a generative AI system (e.g., generative AI system 108).

A generative AI system (e.g., generative AI system 108) is a type of artificial intelligence that is designed to generate or create content, often in the form of text, images, audio, or other media, based on patterns and knowledge learned from large datasets. These systems use machine learning techniques, particularly deep learning, to understand and replicate the structures and features present in the data that they have been trained on. Such systems can then produce new content that is similar in style, format, or content to the data they've been exposed to.

Generative AI systems (e.g., generative AI system 108) have a wide range of applications, including:

Natural Language Generation (NLG): These systems can generate human-like text, including articles, stories, chatbot responses, and more. They are used in content generation, automated report writing, and even creative writing.

Image Generation: Generative models can create images, artwork, or even deepfake videos that resemble real images, often used in creative fields, image synthesis, and data augmentation for machine learning.

Music and Audio Generation: These systems can compose music or generate audio, including speech synthesis. They are used in music composition, voice assistants, and audio effects generation.

Data Augmentation: Generative AI can be used to create synthetic data to augment limited datasets for machine learning tasks, improving model performance.

Style Transfer: Generative AI can apply artistic styles to images or convert images from one artistic style to another, creating unique visual effects.

One of the most well-known types of generative AI models is the Generative Adversarial Network (GAN), where two neural networks, a generator and a discriminator, work in tandem to create content and evaluate its authenticity. This adversarial training process helps the generator improve its content generation capabilities over time.

Grounding material (e.g., grounding material 106) in a generative AI system (e.g., generative AI system 108) refers to providing context or constraints to guide the content generation process. Such grounding material (e.g., grounding material 106) helps ensure that the generated output aligns with specific requirements or objectives. Grounding material (e.g., grounding material 106) is crucial in making the AI-generated content more relevant, coherent, and suitable for a particular application.

Grounding material (e.g., grounding material 106) serves many purposes in generative AI systems including, for example:

Contextual Understanding: Generative AI systems often use context to generate meaningful content. Grounding material (e.g., grounding material 106) can be in the form of input text, images, or other data that sets the context for the generation task. For example, in natural language generation (NLG), if provided with a context sentence, the system may generate follow-up sentences that are coherent and relevant to that context.

Content Customization: Grounding material (e.g., grounding material 106) may be used to customize the generated output. For instance, in e-commerce product descriptions, grounding material (e.g., grounding material 106) like product attributes (size, color, features) may be provided to ensure that the generated descriptions accurately reflect the product's characteristics.

Style and Tone Control: Grounding material (e.g., grounding material 106) can specify the desired style, tone, or voice for the generated content, which may be beneficial in marketing, branding, and creative writing tasks where the content needs to align with a specific brand's identity or writing style.

Multimodal Generation: In generative AI systems that work with multiple modalities (text, images, audio), grounding material (e.g., grounding material 106) can come from different sources or modalities to ensure that the generated content remains coherent and consistent across all modes. For example, when generating a video based on a script (text) and a set of images, the grounding material (e.g., grounding material 106) from both sources should align.

Content Filtering: Grounding material (e.g., grounding material 106) can be used as a filter or constraint to prevent the generation of inappropriate or undesirable content. For example, when generating text or images for a family-friendly audience, the grounding material (e.g., grounding material 106) can specify that the output should exclude explicit or violent elements.

Data Augmentation: In machine learning tasks, grounding material (e.g., grounding material 106) can be used to augment training data. For instance, providing additional context or labels to data points may help the AI system learn more about the relationships between input and output.

Personalization: In applications like recommender systems or personalized content generation, grounding material (e.g., grounding material 106) can include user preferences, browsing history, or demographic information to tailor the generated content to individual users.

Fact-checking and Accuracy: Grounding material (e.g., grounding material 106) can be used to ensure the accuracy and factuality of the generated content. By providing reference information or constraints, AI systems may avoid generating false or misleading information.

In essence, grounding material (e.g., grounding material 106) serves as an input that guides generative AI systems to produce content that is contextually relevant, aligned with objectives, and compliant with desired styles or constraints. It enhances the utility and quality of AI-generated content across various applications.

As will be discussed below in greater detail, grounding material review process 100 may monitor and process the grounding material (e.g., grounding material 106) that a user (e.g., user 104) proposes for training a generative AI system (e.g., generative AI system 108). This processing of the proposed grounding material (e.g., grounding material 106) may result in such proposed ground material (e.g., grounding material 106) being scrutinized to determine the integrity of such proposed grounding material (e.g., grounding material 106). As will be discussed below in greater detail, by processing the material (e.g., grounding material 106) that a user (e.g., user 104) proposes using for grounding a generative AI system (e.g., generative AI system 108), problematic information (e.g., inaccurate, socially-unacceptable, etc.) may be prevented from being used to ground the generative AI system (e.g., generative AI system 108).

Accordingly, grounding material review process 100 may establish 201 a network connection with trusted source material (e.g., trusted-source material 110) so that grounding material review process 100 may access trusted-source material 110. Once such a network connection is established 201, grounding material review process 100 may process 202 the grounding material (e.g., grounding material 106) to confirm the integrity of the grounding material (e.g., grounding material 106).

For example and when processing 202 the grounding material (e.g., grounding material 106) to confirm the integrity of the grounding material (e.g., grounding material 106), grounding material review process 100 may compare 204 at least a portion of the grounding material (e.g., grounding material 106) to such trusted-source material 110.

Trusted source material (e.g., trusted-source material 110) refers to information, data, or content that is obtained from reputable and reliable sources. These sources are known for their credibility, accuracy, and a demonstrated commitment to providing accurate and factual information. Trusted source material (e.g., trusted-source material 110) is utilized in various contexts, including journalism, research, education, and decision-making, because it enhances the reliability and integrity of the information being used or disseminated.

Characteristics of trusted source material typically include:

Credibility: Trusted sources have a well-established reputation for providing accurate and unbiased information. They are recognized for their expertise and commitment to journalistic or research standards.

Accuracy: Information from trusted sources is fact-checked and verified to ensure that it is free from errors, exaggerations, or intentional misinformation.

Transparency: Trusted sources are transparent about their methods and sources of information, allowing others to assess the reliability of their content.

Independence: Trusted sources maintain editorial independence and are not unduly influenced by political, commercial, or ideological interests that could compromise the accuracy or impartiality of their content.

Ethical Standards: Trusted sources adhere to ethical principles and professional codes of conduct, such as journalistic ethics or research ethics, to maintain the highest standards of integrity.

Accountability: Trusted sources take responsibility for their content and are willing to correct errors or clarify information when necessary.

Examples of trusted source material can vary depending on the context:

In journalism, trusted sources often include established news organizations with a track record of reliable reporting, such as The New York Times, BBC, or Reuters.

In academic research, trusted source material may include peer-reviewed journals, academic publications, and research institutions known for rigorous research methodologies.

In government and policymaking, trusted source material may come from official government agencies and organizations responsible for data collection and analysis.

In health and medicine, trusted source material may be obtained from reputable medical journals, healthcare institutions, and government health agencies like the World Health Organization (WHO) or the Centers for Disease Control and Prevention (CDC).

In historical information, trusted source material may be obtained from reputable encyclopedias and historical journals such as Encyclopedia Brittanica and National Geographic publications.

Further and when processing 202 the grounding material (e.g., grounding material 106) to confirm the integrity of the grounding material (e.g., grounding material 106), grounding material review process 100 may process 206 the grounding material (e.g., grounding material 106) to confirm the accuracy the grounding material (e.g., grounding material 106). For example, grounding material review process 100 may identify an appropriate trusted source material (e.g., trusted-source material 110) and establish 201 a network connection with the same so that grounding material review process 100 may access trusted-source material 110. Once such a network connection is established 201, grounding material review process 100 may compare information (e.g., facts, figures, dates, theories, phases) included within the trusted source material (e.g., trusted-source material 110) to information (e.g., facts, figures, dates, theories, phases) included within the grounding material (e.g., grounding material 106) to confirm the integrity of the grounding material (e.g., grounding material 106). Accordingly, if the grounding material (e.g., grounding material 106) concerns the events that led to the starting of World War I, grounding material review process 100 may identify an appropriate trusted-source material 110 (e.g., an article within Encyclopedia Brittanica) and compare information (e.g., facts, figures, dates, theories, phases) included within trusted-source material 110 to information (e.g., facts, figures, dates, theories, phases) included within the grounding material (e.g., grounding material 106) to confirm the integrity of the grounding material (e.g., grounding material 106).

Additionally and when processing 202 the grounding material (e.g., grounding material 106) to confirm the integrity of the grounding material (e.g., grounding material 106), grounding material review process 100 may process 208 the grounding material (e.g., grounding material 106) to confirm that the grounding material (e.g., grounding material 106) does not include any socially-unacceptable material (e.g., socially-unacceptable material 112). For example, grounding material review process 100 may scan/review the grounding material (e.g., grounding material 106) to determine if the grounding material (e.g., grounding material 106) includes any socially-unacceptable material (e.g., socially-unacceptable material 112) or may use machine learning-based content classification techniques.

Examples of the socially-unacceptable material (e.g., socially-unacceptable material 112) includes but is not limited to:

Racist Material: Racist material encompasses content that promotes discrimination and prejudice based on a person's racial or ethnic background. It often perpetuates harmful stereotypes, biases, and animosity towards certain racial or ethnic groups, leading to a climate of inequality, hatred, and social division. Racist material can manifest in various forms, including hate speech, derogatory slurs, caricatures, or discriminatory policies and practices, and it may pose a significant threat to social cohesion and the well-being of marginalized communities.

Sexist Material: Sexist material perpetuates gender-based discrimination and inequality, targeting individuals based on their gender or sex. It often manifests through objectification, unequal treatment, or the reinforcement of harmful gender stereotypes. Sexist material can contribute to a culture of sexism, misogyny, and gender-based violence, hindering progress towards gender equality and undermining the dignity and rights of individuals of all genders.

Homophobic Material: Homophobic material fosters discrimination and intolerance towards individuals based on their sexual orientation, particularly those who identify as LGBTQ+. It frequently involves negative stereotypes, derogatory language, or biased portrayals that marginalize and stigmatize LGBTQ+ people. Homophobic material can have severe consequences, including psychological harm, social exclusion, and the perpetuation of prejudice, hindering efforts to create inclusive and accepting societies.

Xenophobic Material: Xenophobic material promotes fear, hatred, or discrimination against individuals from different countries or cultures. It often portrays them as threats to one's own group or as inferior, contributing to divisions along cultural and national lines. Xenophobic material can lead to prejudice, hostility, and even violence against immigrants, refugees, or anyone perceived as an outsider, obstructing efforts to foster diversity and multiculturalism.

Islamophobic Material: Islamophobic material targets followers of Islam, promoting discrimination and stereotypes about Muslims, their beliefs, and practices. It often portrays Islam and its adherents negatively, fostering religious intolerance and bias. Islamophobic material can contribute to hate crimes, exclusion, and the marginalization of Muslim communities, undermining social cohesion and religious freedom.

Antisemitic Material: Antisemitic material promotes discrimination against Jewish individuals, perpetuating stereotypes, conspiracy theories, and hatred towards Jews, their history, and their culture. It has historically led to widespread discrimination, violence, and persecution against Jewish communities. Antisemitic material remains a grave concern, as it threatens religious and racial harmony and human rights.

Ableist Material: Ableist material targets people with disabilities, spreading discrimination and stereotypes about their abilities and worth. It often perpetuates harmful biases and exclusion, hindering efforts to create accessible and inclusive societies. Ableist material can lead to unequal opportunities, social isolation, and discrimination against individuals with disabilities.

Misogynistic Material: Misogynistic material promotes discrimination against women, often through objectification, stereotypes, and the endorsement of unequal treatment based on gender. It contributes to gender-based violence, inequality, and the reinforcement of harmful gender norms, hindering progress towards gender equity.

Conspiracy Material: Conspiracy material includes content that promotes unproven or false theories, often involving secretive plots or cover-ups. Such material can mislead and create unfounded fear or distrust, undermining trust in credible sources of information and contributing to the spread of misinformation and societal discord.

Extremist Material: Extremist material advocates for radical ideologies or violent actions, often promoting hate and intolerance towards certain groups, religions, or governments. Such material poses a significant threat to societal harmony and stability, potentially leading to violence, extremism, and terrorism.

Cyberbullying Material: Cyberbullying material involves online harassment, intimidation, or cruelty directed at individuals or groups, causing emotional distress, harm, or psychological suffering. It can have severe consequences for victims' mental health and well-being, requiring measures to combat and prevent cyber-bullying.

Self-Harm Material: Self-harm material provides instructions or encouragement for self-destructive behaviors, potentially endangering the physical and mental well-being of vulnerable individuals. Such material is a matter of grave concern, requiring proactive measures to protect individuals from harm.

Hate Speech: Hate speech encompasses expressions that incite violence, discrimination, or harm towards individuals or groups based on their characteristics, beliefs, or affiliations. It aims to create hostility and fear, posing a threat to social harmony, safety, and the fundamental principles of free speech.

Disinformation: Disinformation refers to false or misleading information intentionally spread to deceive or manipulate, often for political, economic, or social gain. Such material undermines trust in accurate sources of information, distorts public discourse, and can have far-reaching consequences on public perception and decision-making.

Misinformation: Misinformation involves the unintentional dissemination of false or inaccurate information, often due to errors or misunderstandings. Such material contributes to the spread of falsehoods and can impact public understanding of important issues, requiring efforts to promote media literacy and fact-checking.

Harmful/Dangerous Instructions: Harmful or dangerous instructions include content that provides guidance on actions that can lead to physical harm, injury, or illegal activities. Such instructions endanger the safety of individuals or the public and should be addressed to prevent harm.

Continuing with the above-stated example in which the grounding material (e.g., grounding material 106) concerns events that led to the starting of World War I and grounding material review process 100 compares information (e.g., facts, figures, dates, theories, phases) included within trusted-source material 110 (e.g., Encyclopedia Brittanica) to information (e.g., facts, figures, dates, theories, phases) included within the grounding material (e.g., grounding material 106), grounding material review process 100 may allow 210 the grounding material (e.g., grounding material 106) to be utilized in the generative AI system (e.g., generative AI system 108) if the integrity of the grounding material (e.g., grounding material 106) is confirmed (via one or more of the above-defined methodologies). Conversely, grounding material review process 100 may prevent 212 at least a portion of the grounding material (e.g., grounding material 106) from being utilized in the generative AI system (e.g., generative AI system 108) if the integrity of the at least a portion of the grounding material (e.g., grounding material 106) cannot be confirmed (via one or more of the above-defined methodologies).

Grounding material review process 100 may enable 214 the user (e.g., user 104) to revise at least a portion of the grounding material (e.g., grounding material 106) if the integrity of the at least a portion of the grounding material (e.g., grounding material 106) cannot be confirmed. For example, it is typically acknowledged that the assassination of Arch Duke Frans Ferdinand of Austria-Hungary, which occurred on 28 Jun. 1914, led to the starting of World War I. Assuming that the grounding material (e.g., grounding material 106) offered by the user (e.g., user 104) incorrectly states that KING Frans Ferdinand of Austria-Hungary was assassinated on 28 Aug. 1914, grounding material review process 100 may prevent 212 grounding material 106 from being utilized in generative AI system 108 since the integrity of grounding material 106 cannot be confirmed.

Accordingly and while grounding material review process 100 may reject grounding material 106 in its entirety, grounding material review process 100 may enable 214 user 104 to revise the inaccurate portions of grounding material 106 (i.e., the title and assassination date of Arch Duke Ferdinand) so that the integrity of grounding material 106 may be confirmed.

Grounding material review process 100 may penalize 216 the user (e.g., user 104) if the integrity of the at least a portion of the grounding material (e.g., grounding material 106) cannot be confirmed, wherein such penalization of user 104 may include but is not limited to one or more of:

Warning the User: When warning the user (e.g., user 104), grounding material review process 100 may inform user 104 that the integrity of grounding material 106 could not be confirmed and, if such behaviour continues, user 104 may be subject to disciplinary action.

Suspending the User: When suspending the user (e.g., user 104), grounding material review process 100 may inform user 104 that the integrity of grounding material 106 could not be confirmed and they have been suspended from using generative AI system 108 for a defined period of time.

Banning the User: When banning the user (e.g., user 104), grounding material review process 100 may inform user 104 that the integrity of grounding material 106 could not be confirmed and that have been banned from any future use of generative AI system 108.

Additionally, grounding material review process 100 may use reputation-based blacklisting (i.e., based on grounding material source) if the source/URL is known. For example, if a certain URL is known for promoting far-fetched baseless conspiracy theories, this URL may be blacklisted to proudly prohibit information/content from this URL from being used for grounding material purposes. The above examples are for illustrative purposes only and are not intended to be a limitation of this disclosure, as other configurations are possible and are considered to be within the scope of this disclosure. For example, grounding material review process 100 may silently ignore all or portions of grounding material 106 (i.e., the title and assassination date of Arch Duke Ferdinand).

Figure 3:
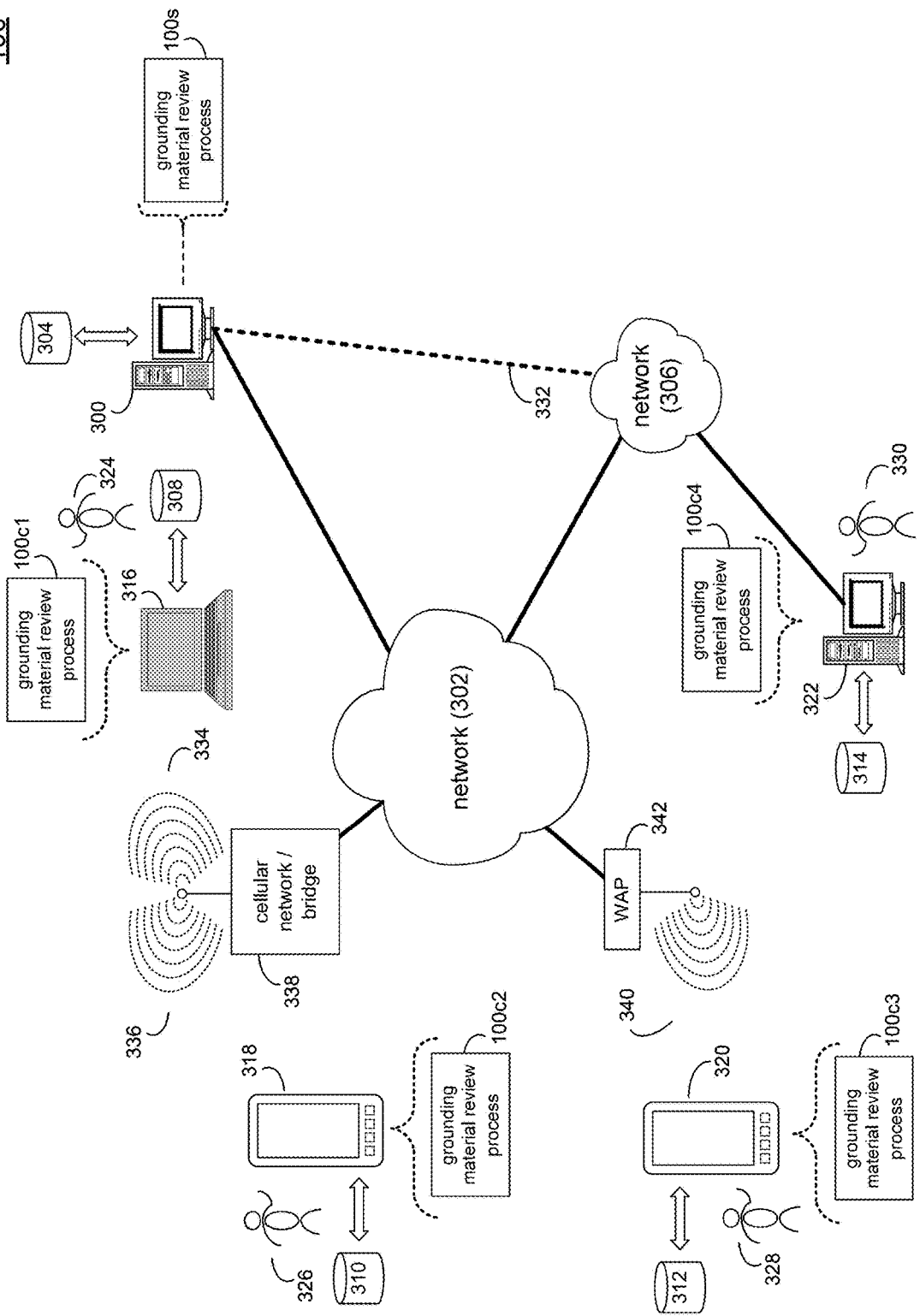
FIG. 3 is a diagrammatic view of a computer system and the grounding material review process of FIG. 1 coupled to a distributed computing network in accordance with various embodiments of the present disclosure.

System Overview:

Referring to FIG. 3, there is shown grounding material review process 100. Grounding material review process 100 may be implemented as a server-side process, a client-side process, or a hybrid server-side/client-side process. For example, grounding material review process 100 may be implemented as a purely server-side process via grounding material review process 100s. Alternatively, grounding material review process 100 may be implemented as a purely client-side process via one or more of grounding material review process 100c1, grounding material review process 100c2, grounding material review process 100c3, and grounding material review process 100c4. Alternatively still, grounding material review process 100 may be implemented as a hybrid server-side/client-side process via grounding material review process 100s in combination with one or more of grounding material review process 100c1, grounding material review process 100c2, grounding material review process 100c3, and grounding material review process 100c4.

Accordingly, grounding material review process 100 as used in this disclosure may include any combination of grounding material review process 100s, grounding material review process 100c1, grounding material review process 100c2, grounding material review process 100c3, and grounding material review process 100c4.

Grounding material review process 100s may be a server application and may reside on and may be executed by computing device 300, which may be connected to network 302 (e.g., the Internet or a local area network). Examples of computing device 300 may include, but are not limited to: a personal computer, a server computer, a series of server computers, a mini computer, a mainframe computer, a smartphone, or a cloud-based computing platform.

The instruction sets and subroutines of grounding material review process 100s, which may be stored on storage device 304 coupled to computing device 300, may be executed by one or more processors (not shown) and one or more memory architectures (not shown) included within computing device 300. Examples of storage device 304 may include but are not limited to: a hard disk drive; a RAID device; a random-access memory (RAM); a read-only memory (ROM); and all forms of flash memory storage devices.

Network 302 may be connected to one or more secondary networks (e.g., network 306), examples of which may include but are not limited to: a local area network; a wide area network; or an intranet, for example.

Examples of grounding material review processes 300c1, 300c2, 300c3, 300c4 may include but are not limited to a web browser, a game console user interface, a mobile device user interface, or a specialized application (e.g., an application running on e.g., the Android™ platform, the iOS™ platform, the Windows™ platform, the Linux™ platform or the UNIX™ platform). The instruction sets and subroutines of grounding material review processes 300c1, 300c2, 300c3, 300c4, which may be stored on storage devices 308, 310, 312, 314 (respectively) coupled to client electronic devices 316, 318, 320, 322 (respectively), may be executed by one or more processors (not shown) and one or more memory architectures (not shown) incorporated into client electronic devices 316, 318, 320, 322 (respectively). Examples of storage devices 308, 310, 312, 314 may include but are not limited to: hard disk drives; RAID devices; random access memories (RAM); read-only memories (ROM), and all forms of flash memory storage devices.

Examples of client electronic devices 316, 318, 320, 322 may include, but are not limited to a personal digital assistant (not shown), a tablet computer (not shown), laptop computer 316, smart phone 318, smart phone 320, personal computer 322, a notebook computer (not shown), a server computer (not shown), a gaming console (not shown), and a dedicated network device (not shown). Client electronic devices 316, 318, 320, 322 may each execute an operating system, examples of which may include but are not limited to Microsoft Windows™, Android™, iOS™, Linux™, or a custom operating system.

Users 324, 326, 328, 330 may access grounding material review process 10 directly through network 302 or through secondary network 306. Further, grounding material review process 10 may be connected to network 302 through secondary network 306, as illustrated with link line 332.

The various client electronic devices (e.g., client electronic devices 316, 318, 320, 322) may be directly or indirectly coupled to network 302 (or network 306). For example, laptop computer 316 and smart phone 318 are shown wirelessly coupled to network 302 via wireless communication channels 334, 336 (respectively) established between laptop computer 316, smart phone 318 (respectively) and cellular network/bridge 338, which is shown directly coupled to network 302.

Further, smart phone 320 is shown wirelessly coupled to network 302 via wireless communication channel 340 established between smart phone 320 and wireless access point (i.e., WAP) 342, which is shown directly coupled to network 302. Additionally, personal computer 322 is shown directly coupled to network 306 via a hardwired network connection.

WAP 342 may be, for example, an IEEE 802.11a, 802.11b, 802.11g, 802.11n, Wi-Fi, and/or Bluetooth device that is capable of establishing wireless communication channel 340 between smart phone 320 and WAP 342. As is known in the art, IEEE 802.11x specifications may use Ethernet protocol and carrier sense multiple access with collision avoidance (i.e., CSMA/CA) for path sharing. As is known in the art, Bluetooth is a telecommunications industry specification that allows e.g., mobile phones, computers, and personal digital assistants to be interconnected using a short-range wireless connection.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implement method, executed on a computing device, comprising:
   receiving a request from a user to use grounding material in a generative AI system;
   establishing a network connection with trusted-source material to allow access to the trusted-source material;
   processing the grounding material to identify at least a portion of the grounding material that fails to comply with one or more integrity requirements; and
   rejecting the portion of the grounding material that fails to comply with the one or more integrity requirements and enabling the user to revise the grounding material to meet the one or more integrity requirements before allowing the revised grounding material to be utilized in the generative AI system.

2. The computer-implement method of claim 1, wherein processing the grounding material includes:
   comparing at least the portion of the grounding material to the trusted-source material.

3. The computer-implement method of claim 1, wherein processing the grounding material includes:
   processing the grounding material to confirm that the grounding material does not include any socially-unacceptable material.

4. The computer-implement method of claim 3, wherein the socially-unacceptable material includes one or more of:
   racist material;
   sexist material;
   homophobic material;
   xenophobic material;
   Islamophobic material;
   antisemitic material;
   ableist material;
   misogynistic material;
   conspiracy material;

extremist material;
cyberbullying material;
self-harm material;
hate speech;
disinformation;
misinformation; and
harmful/dangerous instructions.

5. The computer-implement method of claim 1 further comprising:
penalizing the user if the revised grounding material fails to comply with the one or more integrity requirements.

6. The computer-implement method of claim 5, wherein penalizing the user includes one or more of:
warning the user;
suspending the user; and
banning the user.

7. The computer-implement method of claim 1, wherein the one or more integrity requirements includes a reliability requirement.

8. The computer-implement method of claim 1, wherein the one or more integrity requirements includes an accuracy requirement.

9. The computer-implement method of claim 1, wherein the one or more integrity requirements includes an ethical requirement.

10. The computer-implement method of claim 1, wherein enabling the user to revise the grounding material includes prompting the user to revise the grounding material.

11. A computer program product residing on a non-transitory computer readable medium having programming instructions stored thereon which, when executed by a processor of a system, causes the system to perform the following operations:
receiving a request from a user to use grounding material in a generative AI system;
establishing a network connection with trusted-source material to allow access to the trusted-source material;
processing the grounding material to identify at least a portion of the grounding material that fails to comply with one or more integrity requirements; and
rejecting the portion of the grounding material that fails to comply with the one or more integrity requirements and enabling the user to revise the grounding material to meet the one or more integrity requirements before allowing the revised grounding material to be utilized in the generative AI system.

12. The computer program product of claim 11, wherein processing the grounding material includes:
comparing at least the portion of the grounding material to the trusted-source material.

13. The computer program product of claim 12, wherein processing the grounding material includes:
processing the grounding material to confirm that the grounding material does not include any socially-unacceptable material.

14. The computer program product of claim 13, wherein the socially-unacceptable material includes one or more of:
racist material;
sexist material;
homophobic material;
xenophobic material;
Islamophobic material;
antisemitic material;
ableist material;
misogynistic material;
conspiracy material;
extremist material;
cyberbullying material;
self-harm material;
hate speech;
disinformation;
misinformation; and
harmful/dangerous instructions.

15. The computer program product of claim 11, wherein the programming instructions further cause the system to perform the following operation:
penalizing the user if the revised grounding material fails to comply with the one or more integrity requirements.

16. The computer program product of claim 15, wherein penalizing the user includes one or more of:
warning the user;
suspending the user; and
banning the user.

17. The computer program product of claim 11, wherein the one or more integrity requirements includes at least one of a reliability requirement, an accuracy requirement, and an ethical requirement.

18. A computing system comprising:
a processor; and
a memory storing programming instructions for execution by the processor, the programming instructions, upon execution by the processor, causing the computing system to perform the following operations:
receiving a request from a user to use grounding material in a generative AI system;
establishing a network connection with trusted-source material to allow access to the trusted-source material;
processing the grounding material to identify at least a portion of the grounding material that fails to comply with one or more integrity requirements; and
rejecting the portion of the grounding material that fails to comply with the one or more integrity requirements and enabling the user to revise the grounding material to meet the one or more integrity requirements before allowing the revised grounding material to be utilized in the generative AI system.

19. The computing system of claim 18, wherein the one or more integrity requirements includes at least one of a reliability requirement, an accuracy requirement, and an ethical requirement.

* * * * *